United States Patent [19]
Elliott et al.

[11] 3,974,051
[45] Aug. 10, 1976

[54] PRODUCTION OF HYPOCHLORITE FROM IMPURE SALINE SOLUTIONS

[75] Inventors: Joseph E. Elliott; Neil W. Stillman, both of Madison; John E. Bennett, Painesville, all of Ohio

[73] Assignee: Diamond Shamrock Corporation, Cleveland, Ohio

[22] Filed: May 7, 1975

[21] Appl. No.: 575,333

[52] U.S. Cl. .............................. 204/149; 204/95; 204/267; 204/280
[51] Int. Cl.² ...................... C25B 1/24; C25B 1/26; C25B 11/02
[58] Field of Search .............. 204/94, 95, 149, 152, 204/267, 280, 291, 292, 293

[56] References Cited
UNITED STATES PATENTS

| | | | |
|---|---|---|---|
| 1,442,238 | 1/1923 | Smith | 204/292 X |
| 1,552,610 | 9/1925 | Hybinette | 204/292 |
| 3,291,714 | 12/1966 | Hall et al. | 204/256 |
| 3,479,281 | 11/1969 | Kikindai et al. | 204/149 X |
| 3,592,750 | 7/1971 | Lee | 204/95 |
| 3,732,157 | 5/1973 | DeWitt | 204/95 X |
| 3,783,114 | 1/1974 | Ishii et al. | 204/149 |
| 3,799,849 | 3/1974 | Cook, Jr. et al. | 204/95 |
| 3,893,902 | 7/1975 | Loftfield et al. | 204/95 |

*Primary Examiner*—John H. Mack
*Assistant Examiner*—A. C. Prescott
*Attorney, Agent, or Firm*—Timothy E. Tinkler

[57] ABSTRACT

The formation of hardness-caused deposits on the cathodic surfaces of cells used in the electrolytic production of hypochlorite from impure saline solutions is reduced and good current efficiencies are realized by employing flat, continuous cathodes having a surface roughness of less than $2.54 \times 10^{-4}$ cm. and passing said solution by said cathodes during electrolysis at a velocity of from 0.3 meter/sec. to the number which is equal to the log expressed by the formula: Log velocity (in m/sec/3) = 1.0 − (available $Cl_2$ concentration, in grams per liter, divided by 4).

4 Claims, No Drawings

PRODUCTION OF HYPOCHLORITE FROM IMPURE SALINE SOLUTIONS

BACKGROUND OF THE INVENTION

It is common practice to add chemicals to sewage in order to disinfect same prior to discharge thereof into the surrounding watershed. Recently, considerable attention has been directed to the on-site generation of such disinfecting chemicals, especially sodium hypochlorite, in electrolytic cells. Such on-site production is desirable owing to the problems and expense involved in shipping and storing dilute hypochlorite solutions and the dangers in handling the more concentrated chlorine gas in urban areas. Such processes are particularly attractive in coastal locations where the salt values of sea water provide an economical source of the hypochlorite precursor, sodium chloride. Inland, electrolytes may be prepared from solid sodium chloride, whether pure or impure.

The electrolysis of sea, brackish, or impure salt water leads to a pronounced problem, however, in the nature of the formation of heavy deposits on the cathodic surfaces. These deposits, generally of calcium and magnesium hydroxides and carbonates, are apparently caused by the hardness (calcium, magnesium) values in the electrolyte and lead to pronounced increases in operating cell voltage and ultimately build up to such a thickness as to impede or prevent electrolyte flow.

Therefore, considerable attention has been directed to the removal, prevention, or reduction of these deposits. Among the proposed solutions has been the use of air blasts or acid washes to remove the deposits. Reduction or prevention methods proposed include current density control, the use of streamline electrolyte flow, and high electrolyte velocity. None of these have resulted in a commercially feasible technique because of the down-time which is still required for cleaning and/or the reduction in operating efficiency which seems inevitably to follow, all of which increase the cost of operation.

STATEMENT OF THE INVENTION

Therefore, it is an object of the present invention to reduce or prevent the formation of cathodic deposits during the electrolysis of hardness-containing saline solutions, while allowing the production of hypochlorite solutions at optimum efficiencies.

There has now been found a method for reducing the formation of hardness-caused cathode deposits on the electrolysis of impure aqueous solutions, which method comprises:

a. providing the cathodes of an electrolysis cell in a flat, continuous form, the surfaces of said cathodes having a roughness of less than $2.54 \times 10^{-4}$ cm, and b. passing said saline solution between said cathodes and opposed, parallel anodes during electrolysis at a velocity of from 0.3 meter/sec. to the number which is equal to the log expressed by the formula: log velocity (in m/sec/3) = 1.0 − (available $Cl_2$ concentration, in grams per liter, divided by 4).

Operation according to the foregoing technique affords a number of distinct advantages. Provision of the cathodes in the form of a level, continuous sheet means that there is no place for seed crystals of deposits to catch and grow. A surface with the stated low roughness level is found to remain clear for extended periods. Further, control of the velocity within the stated range allows one to reduce deposit formation without attendant sacrifice in current efficiency, even when seeking to achieve higher hypochlorite concentrations. This interdependency of velocity and concentration is not believed to have been previously recognized. It is the combination of controlling the physical characteristics of the cathode and the velocity/concentration relationship which constitutes the invention, neither factor alone being sufficient to realize long term commercial operation of the cell.

DESCRIPTION OF THE PREFERRED EMBODIMENTS

Essentially, the present invention provides a means to convert impure aqueous saline solutions, especially sea water, into a solution having microbiocidal properties. This is accomplished by the relatively low current density electrolysis of same, without chemical pretreatment thereof, into a hypochlorite solution which may then be mixed directly with the material to be treated, e.g., the effluent water from a municipal waste treatment plant or an industrial cooling stream.

This is achieved generally by introducing the saline solution into an enclosure (cell) having disposed therein an alternating array of vertically-disposed anodes and cathodes, spaced about 0.20 to 0.5 cm apart. On passing the solution between said electrodes and the application of an electrolyzing current, e.g., 1.5 to 25 amperes per square decimeter, chlorine and sodium hydroxide are produced. A rapid chemical reaction then occurs to produce sodium hypochlorite at a concentration which depends upon a variety of factors, such as current density, electrolyte flow rate, temperature, and salinity.

By the term "impure saline solution" it is intended to refer to sea water, brackish water, or an aqueous solution prepared from impure salt, all of which contain calcium and magnesium ions. Generally, the concentration of sodium chloride in the solutions, for economic and practical reasons, will be within the range of from 10–35 g/l.

The cathodes employed herein are flat, in the sense of lying in one level plane, and continuous, i.e., not perforated or segmented. Preferably, the leading and terminal, i.e., vertical, edges are smooth and rounded, rather than being angular. While it may generally be stated that the smoother the surface is, the better the results will be, a maximum roughness of less than $2.54 \times 10^{-4}$ cm. is to be employed. Such cathodes will be metallic, for reasons including wear resistance, electrical conductivity, and low hydrogen overvoltage. Typical are titanium, nickel, and various ferrous and nickel alloys. Especially preferred is Hastelloy C, trademark of Union Carbide Corporation for a nickel alloy. Since the surfaces are metallic, the low roughness values can generally be achieved with conventional metal working techniques, e.g., polishing, if the cathodes have not been directly formed with the desired smooth surface.

The anodes employed are likewise flat, and dimensionally stable, i.e., not significantly subject to chemical or mechanical attrition in use. The anode composition is not critical to the invention, any electrically conductive substrate bearing an electrocatalytically active coating on the surface thereof generally sufficing. Typical is titanium metal coated with a titanium dioxide-ruthenium dioxide solid solution. While sheet, i.e., continuous anodes are satisfactory, superior results will obtain if foraminous anodes are employed. This serves to increase inter-electrode turbulence without detracting from uniformity of velocity, thereby further reducing cathode deposits.

In a preferred embodiment, the lower or "leading" and, preferably, the upper or "trailing" edges of the vertically-disposed anode are rendered or maintained electrocatalytically inactive. This serves to reduce the possibility of formation of deposits on the leading and trailing cathode edges, presumably by reducing the current density on said edges, without necessitating a physical extension of the cathodes. An inactive area of approximately 0.6 – 1.2 vertical centimeters is sufficient to achieve the desired effect.

While the foregoing serves to significantly reduce cathode deposits, it does not appear to constitute a complete answer. Also, efforts to further reduce deposits by increasing the electrolyte velocity, as suggested by the prior art, while in fact achieving that effect, lead to severe decreases in current efficiency, especially when attempting to produce hypochlorite solutions of higher concentration, e.g., greater than 1.0 g/l and up to 4.0 g/l.

It has now been found that the current efficiency of an operating hypochlorite cell is inversely proportional to the velocity of the electrolyte past the electrodes. While acceptable current efficiencies, e.g., greater than 80%, are obtainable at velocities even as high as 1.7 meters/sec. when making 1.0 g/l sodium hypochlorite solutions, a 2.0 g/l solution can be produced at 80% current efficiency only when the velocity is not greater than 1.0 meter/sec. It should be noted that the velocity can not be significantly reduced below 0.3 m/sec. because the deposit problem is also inversely proportional to the velocity. Therefore, in addition to employing cathodes in the physical form stated above, it is also necessary to control the velocity between 0.3 m/sec. and the number which is equal to the log expressed by the formula: log velocity (in m/sec/3) = 1.0 − (available $Cl_2$ concentration, in grams per liter, divided by 4).

Higher hypochlorite concentrations are desirably employed where dilution of the material to be treated or storage of hypochlorite, e.g., for peak load use, is a problem. These increased concentrations may be obtained, within the above parameters, by increasing the height of the cell or increasing the current applied to the cell.

All unstated conditions of operation are conventional and not critical to the invention. For example a pH within the range of 7.0 to 10 and temperature of 5° to 50°C are typically employed in the electrolytic production of sodium hypochlorite from sodium chloride.

In order that those skilled in the art may more readily understand the present invention and certain preferred embodiments by which it may be carried into effect, the following specific examples are afforded.

EXAMPLE 1

A cell is employed containing a plurality of expanded titanium metal anodes bearing a surface coating of a solid solution of titanium and ruthenium dioxides alternated at 0.24 cm. intervals with sheet nickel cathodes having a surface roughness of less than $2.54 \times 10^{-4}$ cm. The electrolyte is sea water (28 g/l NaCl) at a temperature of 25°C. An anodic current density of 7.75 amperes per square decimeter is employed. Operating at an electrolyte velocity past the electrodes of 0.73 meter/second, 0.43 gpl active $Cl_2$ (0.45 gpl as NaOCl) is produced for extended periods of time without deposit formation at 86% Faradaic current efficiency. Attempts to raise the $Cl_2$ concentration above that predicted by the formula herein, result in poor operation.

For example, under the same conditions, a concentration of 3.48 gpl $Cl_2$ is produced at only 21.6% efficiency. On the other hand, stronger solutions are produced at higher efficiencies by lowering electrolyte velocity. For example, at a flow rate of 0.23 m/sec., 3.32 gpl $Cl_2$ is produced at 60.1% efficiency. However, at this low velocity deposit formation quickly becomes a problem.

EXAMPLE 2

A commercial prototype cell is next employed which features anodes as described in Example 1 and sheet titanium cathodes having a surface roughness of $2.5 \times 10^{-4}$ cm, the gap again being 0.24 cm. Sea water at 24°C is the electrolyte. In all instances a current density of 11.6 asd and an electrolyte velocity of 0.6 m/sec. is used. The variable in this example is the hypochlorite concentration achieved, which concentration is increased by the use of a recycle system wherein the same batch of electrolyte is repeatedly passed through the cell until the desired concentration is reached. The following table sets forth the results achieved at varying concentrations.

| Run Number | $Cl_2$ g/l | Efficiency % | Power Consumption ACKWH */kg $Cl_2$ |
|---|---|---|---|
| 1 | 1.11 | 94.4 | 3.35 |
| 2 | 3.31 | 71.8 | 4.76 |
| 3 | 5.80 | 47.7 | 6.23 |

*ACKWH = alternating current kilowatt hours

From the foregoing table it may be seen that Run Number 1, wherein the product concentration is well within the values predicted by the formula disclosed herein, operates at optimum efficiency with a low power consumption. However, as the concentration increases, without a concomitant adjustment in the velocity of electrolyte, efficiency drops and power consumption increases proportionately. From the foregoing it should be apparent that there is a distinct interrelationship between the electrolyte velocity and product concentration with respect to efficiency of operation and prevention of cathode deposits.

EXAMPLE 3

A cell as in Example 2 is employed substituting Hastelloy-C276 nickel-based sheet cathodes having a surface roughness of $11.4 \times 10^{-5}$ cm. At a current density of 15.5 asd, 22°C sea water flowing at a velocity of 0.6 m/sec. produces 29.1 kg/day available $Cl_2$ at a concentration of 0.55 g/l. The deposit problem ordinarily experienced is reduced to a minimum while the cell operates at a current efficiency of 97% and a power consumption of only 3.26 ACKWH/kg $Cl_2$.

EXAMPLE 4

The cell of Example 1 is employed to electrolyze 25°C sea water flowing at 0.6 m/sec. and a current density of 15.5 asd. In the first instance, titanium sheet cathodes having a surface roughness of $7.4 \times 10^{-4}$ cm. are employed. Within 16 hours the operating cell voltage increases by 0.67 volt owing to deposit formation on the cathodes. Substituting identical titanium cathodes but polished to a surface roughness of $12.7 \times 10^{-5}$, the voltage increase is only 0.05 volt since the cathodes remain substantially cleaner.

We claim:

1. A method for reducing the formation of hardness-caused cathode deposits upon the electrolysis of impure aqueous saline solutions, which method comprises:
   a. providing the cathodes of an electrolytic cell in a flat, continuous form, the surfaces of said cathodes having a roughness level of less than $2.54 \times 10^{-4}$ cm. and
   b. passing said saline solution between said cathodes and opposed, paralled anodes during electrolysis at a velocity of from 0.3 meter/sec. to the number which is equal to the log expressed by the formula:
   Log velocity (in m/sec/3) = 1.0 − available $Cl_2$ concentration, in grams pr liter/4

2. A method as in claim 1 wherein the leading and trailing edges of said anodes are electrocatalytically inactive.

3. A method as in claim 1 wherein said anodes are provided in a foraminous form to induce turbulent solution flow between electrodes.

4. A method as in claim 1 wherein said cathodes are formed from sheet nickel alloy.

* * * * *